United States Patent [19]

Bloomquist et al.

[11] 4,286,218
[45] Aug. 25, 1981

[54] MULTIPLE SITE MAGNETOTELLURIC MEASUREMENTS

[75] Inventors: Marvin G. Bloomquist, Arlington; Gustave L. Hoehn, Jr.; Lonnie J. Norton, both of Dallas; Barry N. Warner, Duncanville, all of Tex.

[73] Assignee: Mobil Oil Corporation, New York, N.Y.

[21] Appl. No.: 63,491

[22] Filed: Aug. 6, 1979

[51] Int. Cl.³ .............................................. G01V 3/08
[52] U.S. Cl. .................................... 324/350; 324/347
[58] Field of Search .............................. 324/348–350, 324/357, 358, 360–365, 347

[56] References Cited

U.S. PATENT DOCUMENTS

| | | | |
|---|---|---|---|
| 2,207,060 | 7/1940 | Jakosky | 324/363 |
| 2,263,097 | 11/1941 | Marchand | 324/349 |
| 2,368,218 | 1/1945 | Hayes | 324/348 |
| 2,390,270 | 12/1945 | Piety | 324/357 |
| 2,531,088 | 11/1950 | Thompson | 324/365 |
| 2,677,801 | 5/1954 | Cagniard | 324/350 |
| 3,188,558 | 6/1965 | Yungul | 324/349 |
| 3,344,342 | 9/1967 | Kinghorn | 324/360 |
| 4,041,372 | 8/1977 | Miller et al. | 324/357 |

OTHER PUBLICATIONS

Gamble et al., *Magnetotellurics with a Remote Magnetic Reference,* Geophysics, vol. 44, No. 1, (Jan. 1979); pp. 53-68.

*Primary Examiner*—Gerard R. Strecker
*Attorney, Agent, or Firm*—C. A. Huggett; M. G. Gilman; G. W. Hager

[57] ABSTRACT

A method of magnetotelluric exploration is disclosed which features multiple measurements of the earth's electric field at a plurality of locations and one or more magnetic field measurements being made simultaneously. A specific form of cable for connecting measurement apparatus with recording apparatus is also disclosed.

9 Claims, 5 Drawing Figures

MULTIPLE SITE MAGNETOTELLURIC MEASUREMENTS

BACKGROUND OF THE INVENTION

This invention relates to magnetotelluric geophysical exploration and more particularly to recording magnetotelluric signals along lines of exploration on the surface of the earth.

It has long been known that telluric currents circulate beneath the surface of the earth. The prior art suggests that the measurement of these naturally occuring currents will indicate the resistivity of the earth and hence the geophysical characteristics of the subsurface. These telluric currents are subject to variations caused by external influences, such as sunspot activity. Because these variations are unpredictable, measurement of telluric currents was little used as a geophysical exploration tool until Louis Cagniard devised a mathematical technique capable of accounting for these variations. His work is represented, for example, in U.S. Pat. No. 2,677,801 wherein the proposes measuring not only the telluric currents, but also the magnetic field at a measurement station on the earth's surface. Cagniard teaches that a specific relationship exists between the measured orthogonal components of the earth's magnetic field and the measured orthogonal components of the earth's electric (or "telluric") field, and that spatial variations therein may be used to derive specific information regarding the subterranean structure of the earth. As certain structures are known to be indicative of the presence of minerals, these magnetotelluric measurements are a useful prospecting tool.

The Cagniard method of magnetotelluric exploration usually involves the generation of signals representing the magnetic field and the electric field in two orthogonal directions, usually denoted by $H_x$, $H_y$, $E_x$ and $E_y$ respectively. In this type of exploration it is desirable to record the electric field and the magnetic field at spaced locations along a line of exploration; the data thus generated can be combined with data obtained along parallel lines to yield a three-dimensional picture of the subterranean structure. A similar technique is used in seismic exploration; compare U.S. Pat. No. 3,105,568 to Jolly, which is an example of a seismic exploration technique, commonly referred to as "roll along", which obtains multiple coverage of common depth points in seismic exploration.

SUMMARY OF THE INVENTION

In accordance with the present invention, magnetotelluric measurements are quickly made and recorded at a plurality of spaced locations along a line of exploration.

In carrying out the invention, the electric field of the earth is measured at a plurality of spaced locations along a line of exploration and these measurements are transmitted over a cable to a mobile exploration vehicle (the "base") where the measurements are recorded. One or more measurements are made, usually near the base, of the magnetic field of the earth and are recorded simultaneously with the electric field measurements. Additional magnetic measurements may be desirable from a noise reduction standpoint.

Desirably, the electric field is then measured at a plurality of points along the line of exploration on the other side of the base vehicle and these measurements are transmitted over a second cable to the vehicle where the measurements are recorded simultaneously with the lesser number of measurements of the earth's magnetic field. The line of exploration may be extended by moving the vehicle to the other end of the cable and the steps of measuring, transmitting and recording are repeated, thus economizing on the labor of moving the cable.

In accordance with another aspect of the invention, multiple measurements are desirably provided at each location along the line of exploration to improve the signal-to-noise ratio of the magnetotelluric measurements. In accordance with this aspect of the invention, electric field measurements may be made at least twice per location while the cable is in place. The first set of measurements are transmitted in one direction over the cable and recorded together with the magnetic field measurements made at the end of the cable to which the electric field measurements are transmitted. Then, electric field measurements are again made and transmitted in the other direction over the cable to the vehicle at which the magnetic field measurements are made and recorded together therewith. In this way, the electric field value at each location is measured twice, which data can be used in a known manner to improve the signal-to-noise ratio of the data, and hence the accuracy of the data. Another method of doing this is to record the magnetic fields at two points simultaneously, one at each end of the cable.

If this duplication of measurement technique is used, overlapping measurements of electric field are made. These overlapping measurements are used to improve the signal-to-noise ratio. While the magnetic field of the earth does not generally change over a large area, there is a small variation in magnetic field because of geology. By measuring the magnetic field at both ends of the line on which the electric field measurements have been obtained, it is possible to interpolate the magnetic field so that the magnetic field can be determined rather precisely at the site of each electric field measurement.

In accordance with the invention, multiple overlapping measurements at each location can be obtained by using a plurality of cables and transmitting measurements in both directions over the cable.

A SHORT DESCRIPTION OF THE DRAWINGS

DESCRIPTION OF A PREFERRED EMBODIMENT OF THE INVENTION

Figure 1:
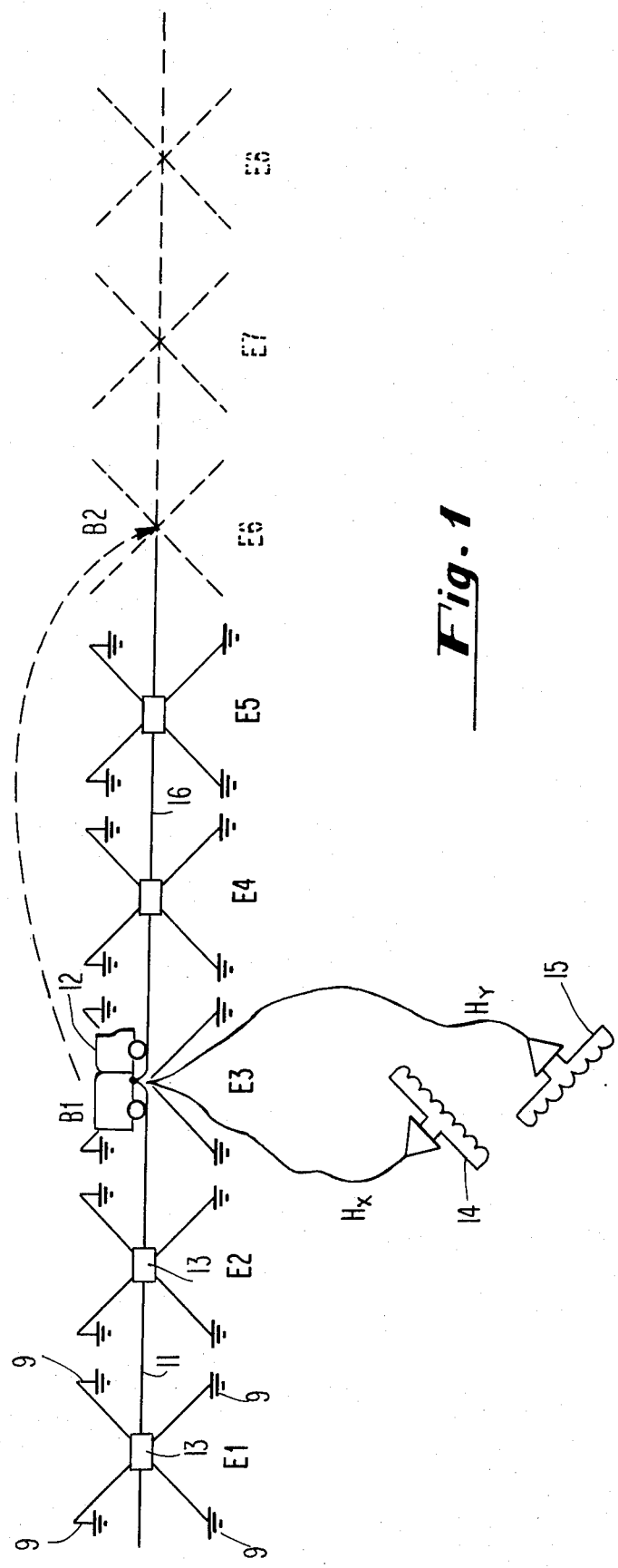
FIG. 1 depicts the magnetotelluric technique of this invention.

In FIG. 1, the electric field is measured at a plurality of locations, E1, E2, E3 along a line of exploration. These measurements are transmitted over a cable 11 to an exploration vehicle 12 where the measurements are recorded. As is conventional in a magnetotelluric exploration, the electric field is measured at each location with four sensors 9 which are connected to preamplifier/connector units 13 at each location to generate signals representing the electric field in the two orthogonal directions. Magnetic coil sensors 14 and 15, oriented similarly to the axes defined by the orientation of the electric field sensors 9, measure the magnetic field of the earth in the vicinity of the exploration vehicle 12. We have found that burying the H field coils 14 and 15 at about a 300 foot distance from the exploration vehicle provides satisfactory results. The measurements of $H_x$ and $H_y$ from coils 14 and 15 are recorded simultaneously with the recording of the electric field measurements.

The electric field is also measured at location E4 and E5 spaced along the line of exploration on the other side of vehicle 12. These measurements of electric field are transmitted along a second section 16 of the cable to the exploration vehicle 12 where the measurements are recorded together with a simulataneous measurement of the magnetic field from the coils 14 and 15. Then, the line of exploration is extended by moving the exploration vehicle 12 from Base B1 to Base B2. The right-hand end of cable section 16 is connected to the recorder in the exploraton vehicle 12 and electric measurements from sites E4 and E5 are again recorded together with a measurement of the magnetic field from the sensors 14 and 15 which are now buried in the vicinity of Base B2. The cable section 11 is moved to the position indicated by dotted lines in FIG. 1 and electric field measurements are made at the locations E6, E7 and E8.

Figure 2:
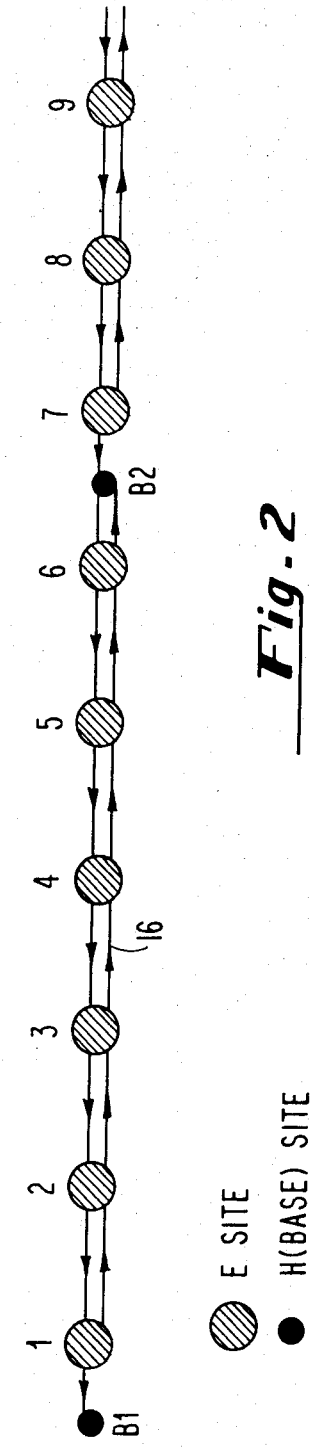
FIG. 2 depicts the manner in which measurements are transmitted in both directions over the cable.
Figure 3:
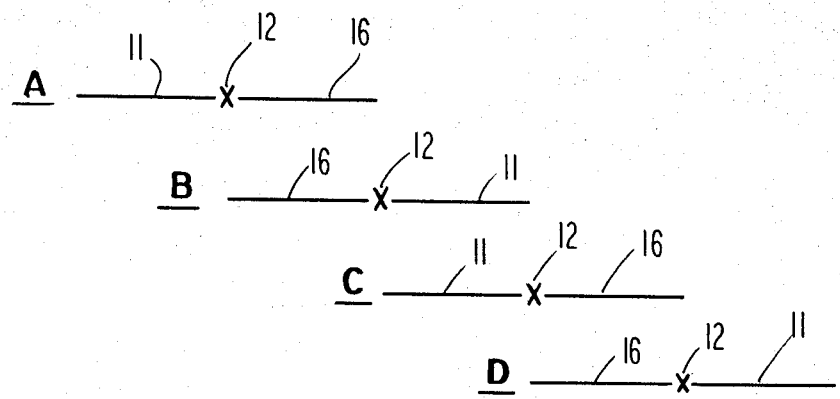
FIGS. 3A–3D depict the method of this invention with two cable configurations to obtain double overlapping coverage.
Figure 4:
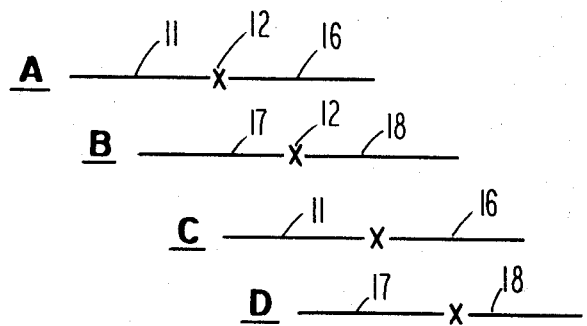
FIGS. 4A–4D depict the use of four cable configurations to obtain quadruple overlapping coverage in accordance with this invention.

FIG. 1 depicts recording at five locations on each cable section, whereas in actual practice we have found that measuring the electric field at six locations on a cable section per base location provides good results. FIG. 2 depicts this process for two bases, B1 and B2. Measurements from the electric field sensors at locations E1, E2 . . . E6 are made and transmitted from right to left to the base B1. After the exploration vehicle has been moved to B2, measurements from the locations E1-E6 are made and transmitted from left to right to be recorded in the vehicle at B2. It is ordinarily adequate to measure the magnetic field $H_x$, $H_y$ at the base sites B1, B2 only, since it varies much more slowly in a spatial sense than does the electric field, although in some cases it may be desirable to measure H at more locations.

FIGS. 3A–3D depict the manner in which double coverage of each location is obtained by moving the cable sections 11 and 16 and explorations vehicle 12 to the successive positions depicted in FIGS. 3A–3D. Lines A, B, C, and D are all along the same line of traverse.

FIGS. 4A–4D depict the manner in which two additional cable sections 17 and 18 can be employed to provide quadruple coverage of each of the locations using an exploration vehicle 12 with the capability for recording the additional data thus generated. As the exploration vehicle 12 and the cable section 11, 16, 17 and 18 are moved to the successive positions shown in FIGS. 4A–4D, the steps of measuring the electric and magnetic field as described previously are repeated.

Figure 5:
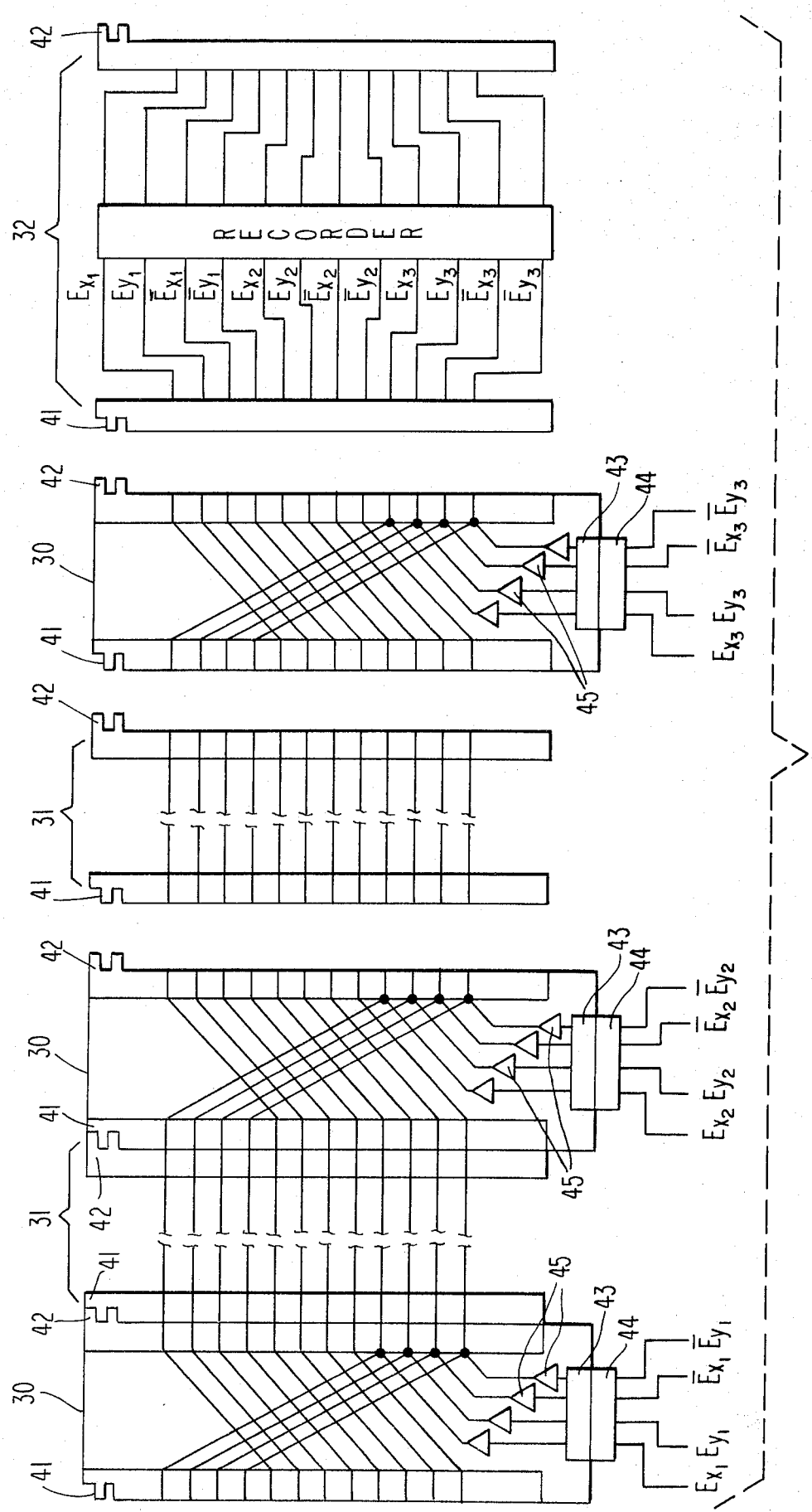
FIG. 5 shows the manner in which identical connector and cable modules may be made and used in order to simplify the practice of the invention.

FIG. 5 shows the cable 16, used to carry the electric field measurements from the locations E1, E2, E3 . . . to the recorder 19 which is in the exploration vehicle at the Base B1 in more detail, the magnetic field measurements being carried to the recording vehicle by separate cables. For example, at a given base location location four electric field sensors 9 produce the measurements $E_W$, $E_S$, $E_E$, and $E_N$. (As a rule the $E_W$ and $E_E$ measurements will be opposite to each other with respect to a given ground potential, as will be $E_S$ and $E_N$.) Therefore, the measurements may be referred to as $E_x$ and $\overline{E}_x$, and $E_y$ and $\overline{E}_y$. These signals are shown in FIG. 5 as being passed by means of a connector 44 and a corresponding receptor 43, into a preamplifiers/connector bos 30 and being preamplified by preamplifiers 45 in order that their relatively weak signals can be strengthened to the point where they will pass over relatively lengthy stretches of cable without adding noise. Signals from three locations 1, 2 and 3 are shown in FIG. 5, represented in turn by $Ex_1$, $Ey_1$, $\overline{Ex}_1$, $\overline{Ey}_1$, $Ex_2$, $Ey_2$ and so on, ending at $\overline{Ey}_3$. In each case the boxes into which they are put are identical preamplifier/connector boxes 30. These are made so that they can be made identical yet pass a number of signals from a number of different locations through identical cable sections 31 without confusion as to source. It will be appreciated that in each case, the incoming signals are brought in at the lowest order of pins on the left side of the connector boxes 30 and are then passed to the next higher order of pins on the right of these boxes. As the signals from, for example, location 1 pass towards the recorder, shown in FIG. 5 on the right, they progressively move up the boxes until they reach the highest order of pins on the left of each box 30 when they go back down to the lowest order. In this way, the inputs can all be put on the same order of pins thus permitting the boxes to be identical. For example, if the transference of signals was not made to the higher order of pins at each box, each would have to be different and be wired separately so that there would be no confusion at the recording stage 32 as to the source of the signals. According to the present invention, the recorder can be located anywhere in the cable, including between any of the sections of cable 31 and connector/preamplifier units 30, and need only know where he is with respect to the two ends of the cable in order to identify the locations from which each of the signals he records is coming from.

Thus, in FIG. 5, a cable/preamplifier connector set-up is shown which allows the simultaneous recording of 12 signals corresponding to orthogonal $E_x$ and $E_y$ signals from three locations. For this application, clearly the magnetic field measurements must also be recorded; the connections therefor which could be straight-line, are not shown. Obviously the concept of the invention, that of moving the signals to higher order connections at each connector, thus permitting the preamplifier/connector boxes to be made identically and the cables to be made with simple straight connections between input and output sides, could be expanded to cover any desired number of locations for magnetotelluric measurements. Three are shown simply for simplicity's sake; in a preferred embodiment field measurements from six locations are recorded simultaneously.

It will be noted that each preamp/connector box and each cable as well as the recorder 32 are provided with male and female keying means 41 and 42 respectively. In this way, there can be no misconnections of cables and preamps; providing the recorder 32 being with identical inputs connected to both male and female type connectors 41 and 42 allows it to be inserted anywhere in the signal line. For example, it could be located between any two of the preamps and connectors shown in FIG. 5 and could simultaneously be receiving signals from both directions. The provision of the higher order transition connection shown in the connector box 30 of FIG. 5 allows this possibility and thus allows a great deal of versatility in the operation not found in the prior art.

In this manner, cable 16, with its multiple conductors, provides paths by which the measured electric field signals can be transmitted in both directions over the cable. Another advantage of the connectors and cabling of the present invention is that the connectors are interchangeable and a recorder can be connected at any point in the cable. In prior art cabling techniques it has only been possible to record at a particular location in the cable. The cable of the present invention provides great flexibility in that the recorder can be connected at any connector. Furthermore, as explained above with reference to FIGS. 3 and 4, the cables can be used, moving one while measuring with the other, thus minimizing downtime. The description of the invention thus far has required four wires to carry the signals from each location. It will be appreciated that in some cases a common ground can be used for $E_x$ and $E_y$, so that only 3 wires are required; the connections would be substantially as shown. Similarly, it will be understood that the recorder may be an analog or digital recorder of conventional type.

While a particular embodiment of the invention has been shown and described, other modifications may be made without departing from the principles of the invention. The appended claims are, therefore, intended to cover all such modifications.

What is claimed is:

1. A magnetotelluric exploration method comprising:
   measuring the earth's electric field at a plurality of locations spaced along a line of exploration;
   transmitting said measurements to a mobile exploration vehicle in a first direction on a cable extending to one side of said mobile exploration vehicle;
   recording said electric field measurements in said exploration vehicle;
   measuring the magnetic field of the earth in at least the area of said exploration vehicle simultaneously with the aforesaid measurements of electric field;
   recording said magnetic field measurements in said exploration vehicle; and
   repeating the steps of measuring the earth's electric field at said plurality of locations transmitting said measurements in the other direction to said mobile exploration vehicle on said cable and recording said measurements to obtain overlapping measurements of electric field at each of said locations.

2. The method recited in claim 1 further comprising:
   repeating the steps of measuring the electric field at a plurality of locations spaced along a line of exploration extending from the other side of said vehicle;
   transmitting the last named measurements of electric field along a second cable to said vehicle; and
   recording said last named measurements and measurements of the magnetic field of the earth in the area of said exploration vehicle.

3. The method recited in claim 2 further comprising:
   extending said line of exploration by moving said exploration vehicle to the other end of one of said cables;
   moving the other cable to the other side of said exploration vehicle; and
   repeating the steps of measuring, transmitting and recording.

4. The method recited in claim 3 wherein the measuring steps are repeated at said locations to obtain overlapping measurements at each of, or a portion of, said locations.

5. The method recited in claim 4 wherein double measurements are made at each of said locations.

6. The method recited in claim 4 wherein third and fourth cables are positioned to overlap said first and second cable to obtain at least four measurements of the electric field at each of said locations.

7. The method recited in claim 3 wherein the step of transmitting comprises:
   transmitting the electric field measurements at each of said plurality of spaced locations in one direction over a plurality of conductors in said cable to one end of said cable for recording; and
   thereafter transmitting the electric field measurements from the same locations in the other direction over a plurality of conductors in said cable to the other end of said cable for recording.

8. A magnetotelluric exploration method comprising:
   measuring the earth's electric field at a plurality of locations spaced along a line of exploration extending from one side of a mobile exploration vehicle;
   transmitting said measurements in a first direction on a cable to said mobile exploration vehicle;
   recording said electric measurements in said exploration vehicle;
   measuring the magnetic field of the earth in the area of said exploration vehicle simultaneously with the aforesaid measurements of electric field;
   recording said magnetic field measurements in said exploration vehicle;
   repeating the steps of measuring the earth's electric field at a plurality of locations spaced along a line of exploration extending from the other side of said vehicle;
   transmitting the last mentioned measurements of electric field along a second cable to said vehicle;
   recording the said last mentioned measurements and a measurement of the magnetic field of the earth in the area of said exploration vehicle;
   extending said line of exploration by moving said exploration vehicle to the other end of one of said cables;
   moving the other cable to the other side of said exploration vehicle; and
   repeating the steps of measuring, transmitting and recording.

9. The method recited in claim 8 wherein the measuring steps are repeated at said locations to obtain overlapping measurements at each of said locations.

* * * * *